(12) United States Patent
Marks

(10) Patent No.: US 11,732,698 B1
(45) Date of Patent: Aug. 22, 2023

(54) RAM AIR TURBINE DEPLOYMENT ACTUATOR HEATER

(71) Applicant: Hamilton Sundstrand Corporation, Charlotte, NC (US)

(72) Inventor: Scott J. Marks, Oregon, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/882,814

(22) Filed: Aug. 8, 2022

(51) Int. Cl.
*F03G 7/06* (2006.01)
*B64D 41/00* (2006.01)

(52) U.S. Cl.
CPC ........ *F03G 7/06112* (2021.08); *B64D 41/007* (2013.01)

(58) Field of Classification Search
CPC .......................... F03G 7/06112; B64D 41/007
See application file for complete search history.

(56) References Cited

U.S. PATENT DOCUMENTS

| | | | |
|---|---|---|---|
| 3,991,572 A | 11/1976 | Huebscher et al. | |
| 4,242,571 A | 12/1980 | Pauliukonis | |
| 7,481,055 B2 | 1/2009 | Safran et al. | |
| 8,857,785 B2 | 10/2014 | Bussear | |
| 2008/0169375 A1* | 7/2008 | Ishikawa | F02C 3/107 244/12.1 |
| 2017/0060125 A1* | 3/2017 | Beaven | B64D 13/08 |
| 2017/0210490 A1* | 7/2017 | Marks | F03D 17/00 |
| 2018/0191011 A1* | 7/2018 | Halsey | H01M 8/04753 |
| 2019/0284997 A1* | 9/2019 | Fakult | F02C 7/047 |
| 2020/0133314 A1* | 4/2020 | Zywiak | G05D 7/0623 |
| 2022/0242579 A1* | 8/2022 | Dreibine | B01D 53/8675 |

* cited by examiner

*Primary Examiner* — Hoang M Nguyen
(74) *Attorney, Agent, or Firm* — Cantor Colburn LLP

(57) ABSTRACT

The present disclosure provides for ram air turbine deployment actuator assemblies utilizing an actuator heater. More particularly, the present disclosure provides for ram air turbine deployment actuator assemblies utilizing an integrated electric heater element in the actuator housing. The present disclosure provides that by warming the hydraulic fluid in a ram air turbine deployment actuator assembly via an actuator heating member (e.g., by warming the hydraulic fluid in a hydraulic fluid cavity or chamber that provides an integrated hydraulic snubbing loop), the viscosity of the hydraulic fluid is reduced, thus helping to reduce ram air turbine deployment time via the actuator heating member of the ram air turbine deployment actuator assembly.

18 Claims, 4 Drawing Sheets

RAM AIR TURBINE DEPLOYMENT ACTUATOR HEATER

TECHNICAL FIELD

The present disclosure relates to ram air turbine deployment actuator assemblies utilizing an actuator heating member and, more particularly, to ram air turbine deployment actuator assemblies utilizing an integrated electric heating member in the actuator housing.

BACKGROUND

In general, ram air turbine ("RAT") systems are typically used to provide emergency electrical and/or hydraulic power to aircraft. System operation can require the RAT to transition from a stowed position internal to the aircraft fuselage to a deployed position external to the aircraft fuselage. In order to achieve RAT deployment, the use of a linear deployment actuator can be used. The actuator can utilize stored spring energy to extend the actuator, additionally, the actuator can utilize an integrated hydraulic loop to provide snubbing to reduce the impact load of the RAT on aircraft structure at the end of deployment. The viscosity of the hydraulic fluid internal to the hydraulic snubbing loop can influence the deployment time of the RAT.

BRIEF DESCRIPTION

The present disclosure provides for ram air turbine deployment actuator assemblies utilizing an actuator heating member. More particularly, the present disclosure provides for ram air turbine deployment actuator assemblies utilizing an integrated electric heating member in the actuator housing.

The present disclosure provides for a ram air turbine deployment actuator assembly including an actuator housing that defines a hydraulic fluid cavity, the hydraulic fluid cavity housing a hydraulic fluid; and a heating member positioned proximal to the hydraulic fluid cavity of the actuator housing; wherein the heating member is configured to increase a temperature of the hydraulic fluid to decrease a viscosity of the hydraulic fluid before or during deployment of a ram air turbine via the ram air turbine deployment actuator assembly.

In addition to one or more of the features described, or as an alternative to any of the foregoing embodiments, the heating member is a probe style resistive heating member, at least a portion of the probe style resistive heating member positioned in the hydraulic fluid cavity of the actuator housing via a threaded boss interface.

In addition to one or more of the features described, or as an alternative to any of the foregoing embodiments, the heating member is a foil type resistive heating member incorporated into or on the actuator housing proximal to hydraulic fluid cavity.

In addition to one or more of the features described, or as an alternative to any of the foregoing embodiments, the heating member is associated with a temperature sensor inserted or positioned into the hydraulic fluid cavity of the actuator housing.

In addition to one or more of the features described, or as an alternative to any of the foregoing embodiments, the temperature of the hydraulic fluid is controlled via temperature feedback from the temperature sensor.

In addition to one or more of the features described, or as an alternative to any of the foregoing embodiments, the temperature feedback is utilized in a power control logic associated with the heating member to maintain power to the heating member when the hydraulic fluid is below a predetermined temperature set-point and to turn off power to the heating member when the hydraulic fluid is above a predetermined temperature set-point.

In addition to one or more of the features described, or as an alternative to any of the foregoing embodiments, the heating member is configured to utilize a power source of an aircraft.

In addition to one or more of the features described, or as an alternative to any of the foregoing embodiments, the hydraulic fluid cavity provides an integrated hydraulic loop to provide snubbing to reduce an impact load of the ram air turbine on aircraft structure during or after deployment.

In addition to one or more of the features described, or as an alternative to any of the foregoing embodiments, the ram air turbine deployment actuator assembly is configured to utilize stored spring energy of a spring to extend a portion of the ram air turbine deployment actuator assembly.

In addition to one or more of the features described, or as an alternative to any of the foregoing embodiments, the ram air turbine deployment actuator assembly comprises a linear deployment actuator and an integrated hydraulic loop.

The present disclosure also provides for a method for operating a ram air turbine deployment actuator including providing an actuator housing that defines a hydraulic fluid cavity, the hydraulic fluid cavity housing a hydraulic fluid; and positioning a heating member proximal to the hydraulic fluid cavity of the actuator housing; and increasing a temperature of the hydraulic fluid, via the heating member, to decrease a viscosity of the hydraulic fluid before or during deployment of a ram air turbine via the ram air turbine deployment actuator.

In addition to one or more of the features described, or as an alternative to any of the foregoing embodiments, the heating member is a probe style resistive heating member, at least a portion of the probe style resistive heating member positioned in the hydraulic fluid cavity of the actuator housing via a threaded boss interface.

In addition to one or more of the features described, or as an alternative to any of the foregoing embodiments, the heating member is a foil type resistive heating member incorporated into or on the actuator housing proximal to hydraulic fluid cavity.

In addition to one or more of the features described, or as an alternative to any of the foregoing embodiments, the heating member is associated with a temperature sensor inserted or positioned into the hydraulic fluid cavity of the actuator housing.

In addition to one or more of the features described, or as an alternative to any of the foregoing embodiments, the temperature of the hydraulic fluid is controlled via temperature feedback from the temperature sensor.

In addition to one or more of the features described, or as an alternative to any of the foregoing embodiments, the temperature feedback is utilized in a power control logic associated with the heating member to maintain power to the heating member when the hydraulic fluid is below a predetermined temperature set-point and to turn off power to the heating member when the hydraulic fluid is above a predetermined temperature set-point.

In addition to one or more of the features described, or as an alternative to any of the foregoing embodiments, the heating member is configured to utilize a power source of an aircraft.

In addition to one or more of the features described, or as an alternative to any of the foregoing embodiments, the hydraulic fluid cavity provides an integrated hydraulic loop to provide snubbing to reduce an impact load of the ram air turbine on aircraft structure during or after deployment.

In addition to one or more of the features described, or as an alternative to any of the foregoing embodiments, the ram air turbine deployment actuator is configured to utilize stored spring energy of a spring to extend a portion of the ram air turbine deployment actuator.

In addition to one or more of the features described, or as an alternative to any of the foregoing embodiments, the ram air turbine deployment actuator comprises a linear deployment actuator and an integrated hydraulic loop.

The above described and other features are exemplified by the following figures and detailed description.

Any combination or permutation of embodiments is envisioned. Additional features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following descriptions should not be considered limiting in any way. With reference to the accompanying drawings, like elements are numbered alike.

Features and aspects of embodiments are described below with reference to the accompanying drawings, in which elements are not necessarily depicted to scale.

Figure 1:
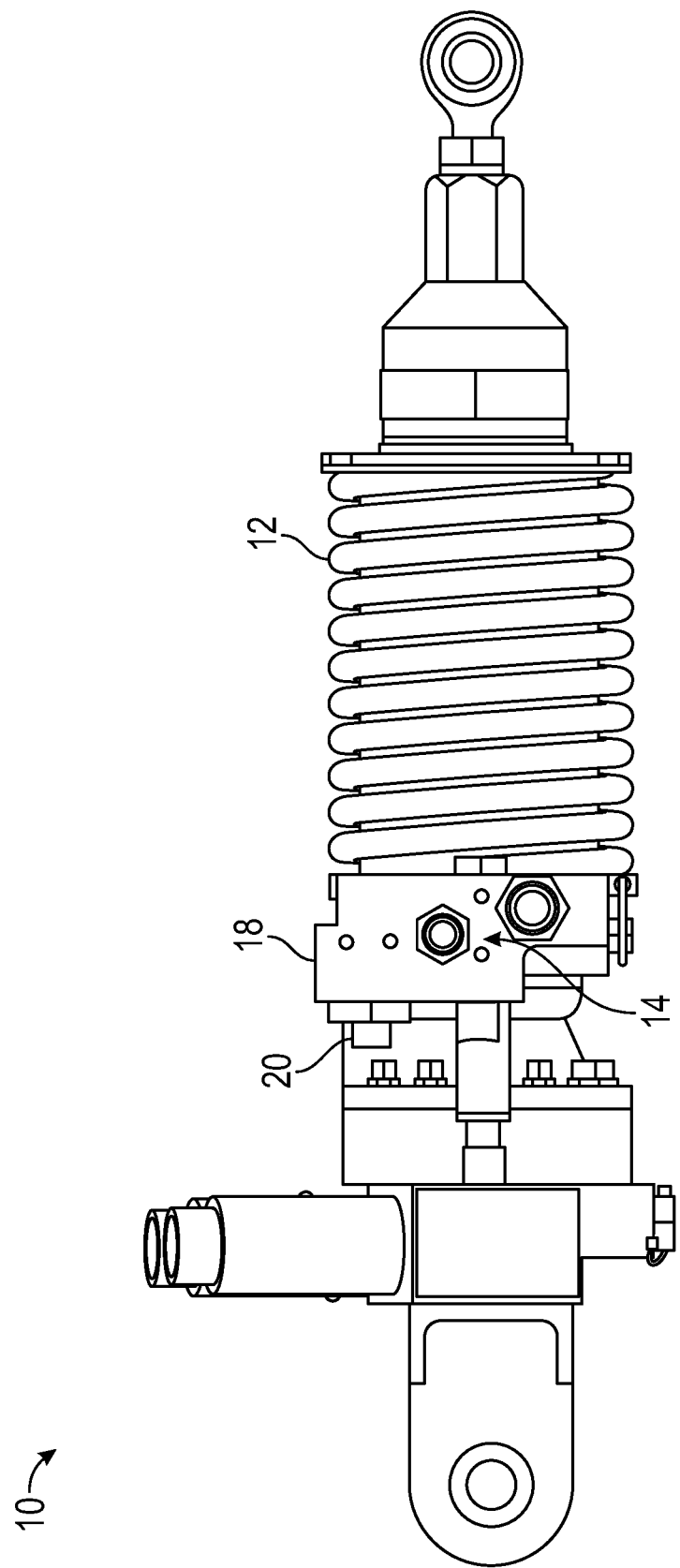
Figure 2:
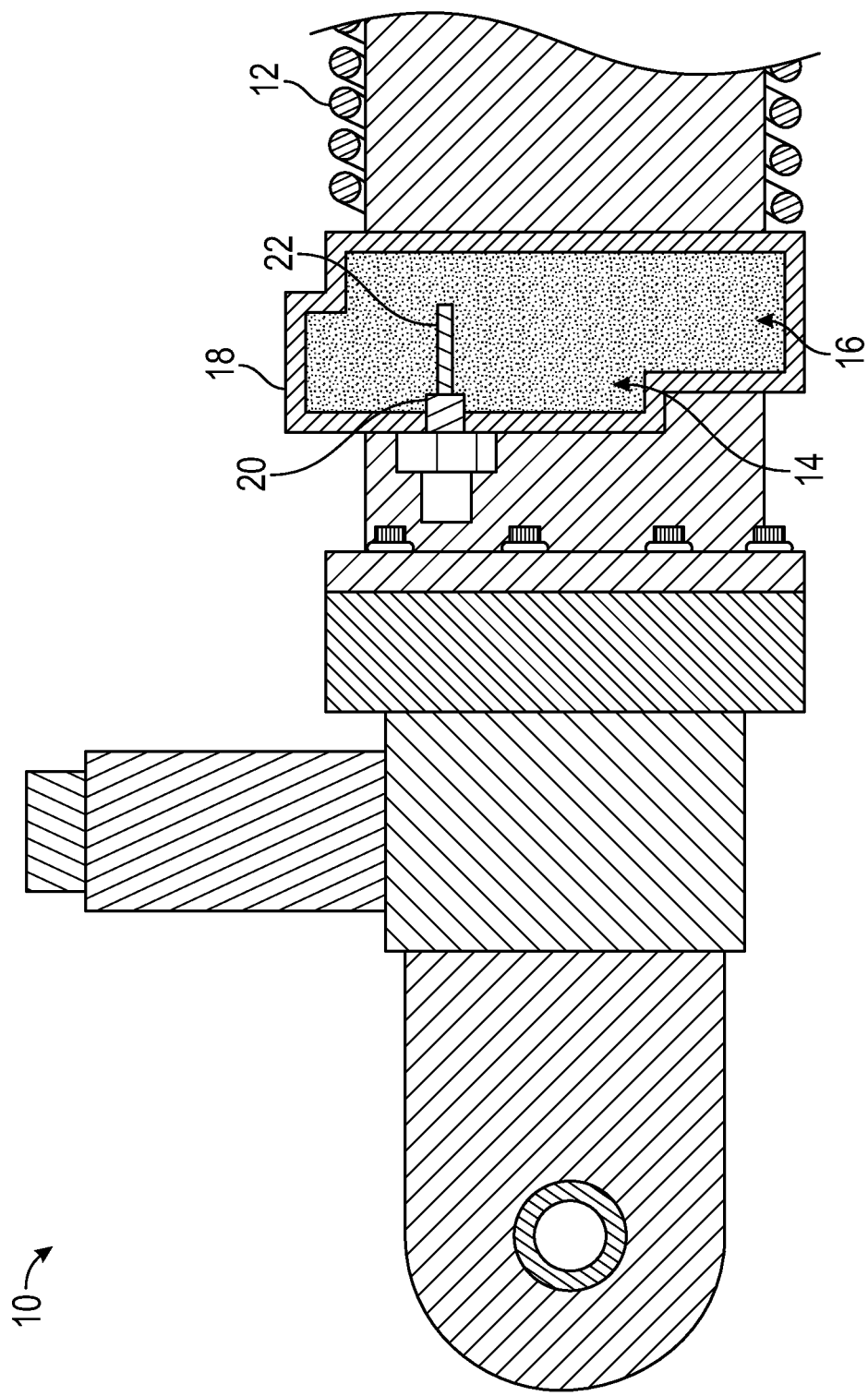
Figure 3:
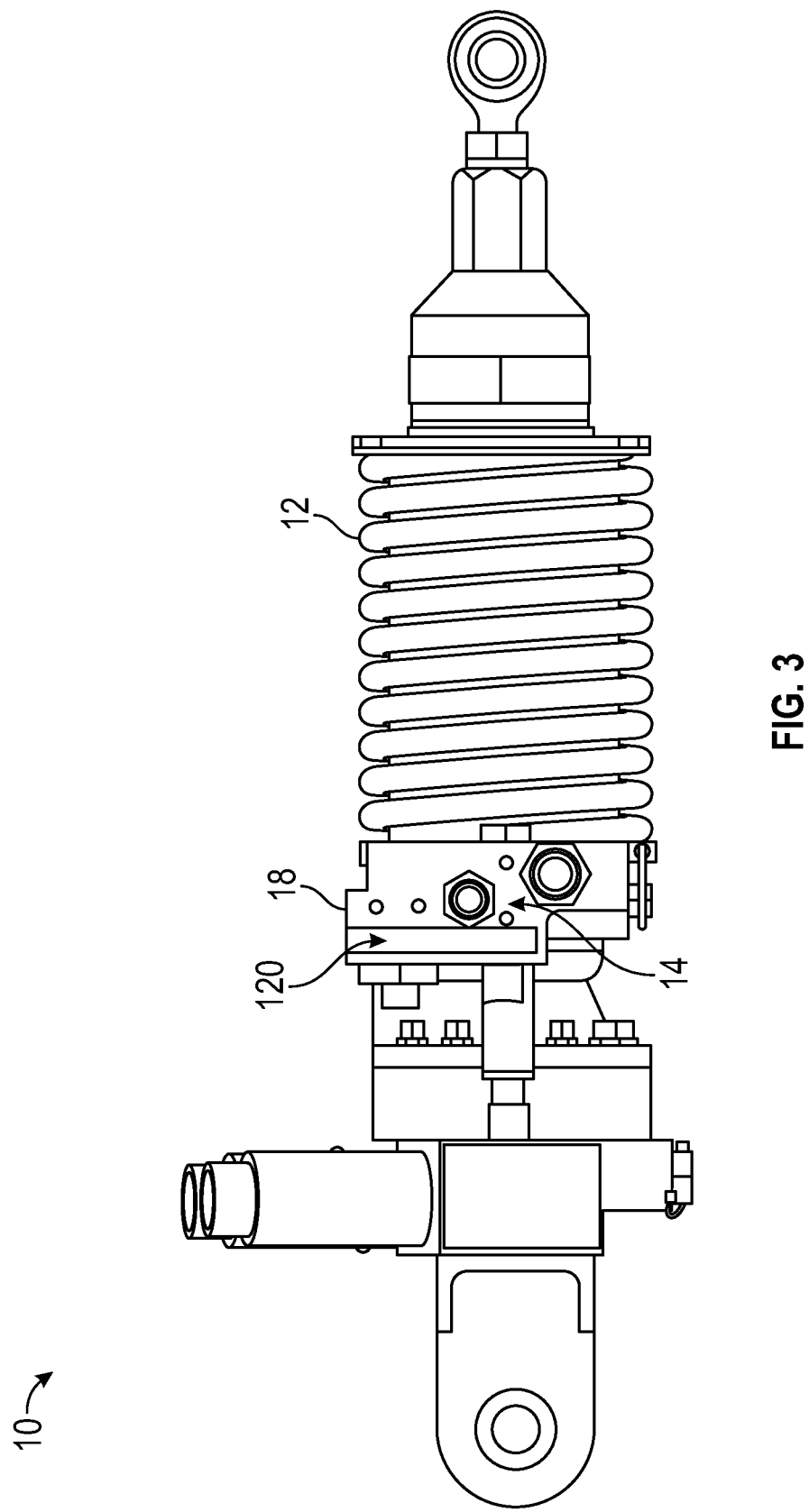
Figure 4:
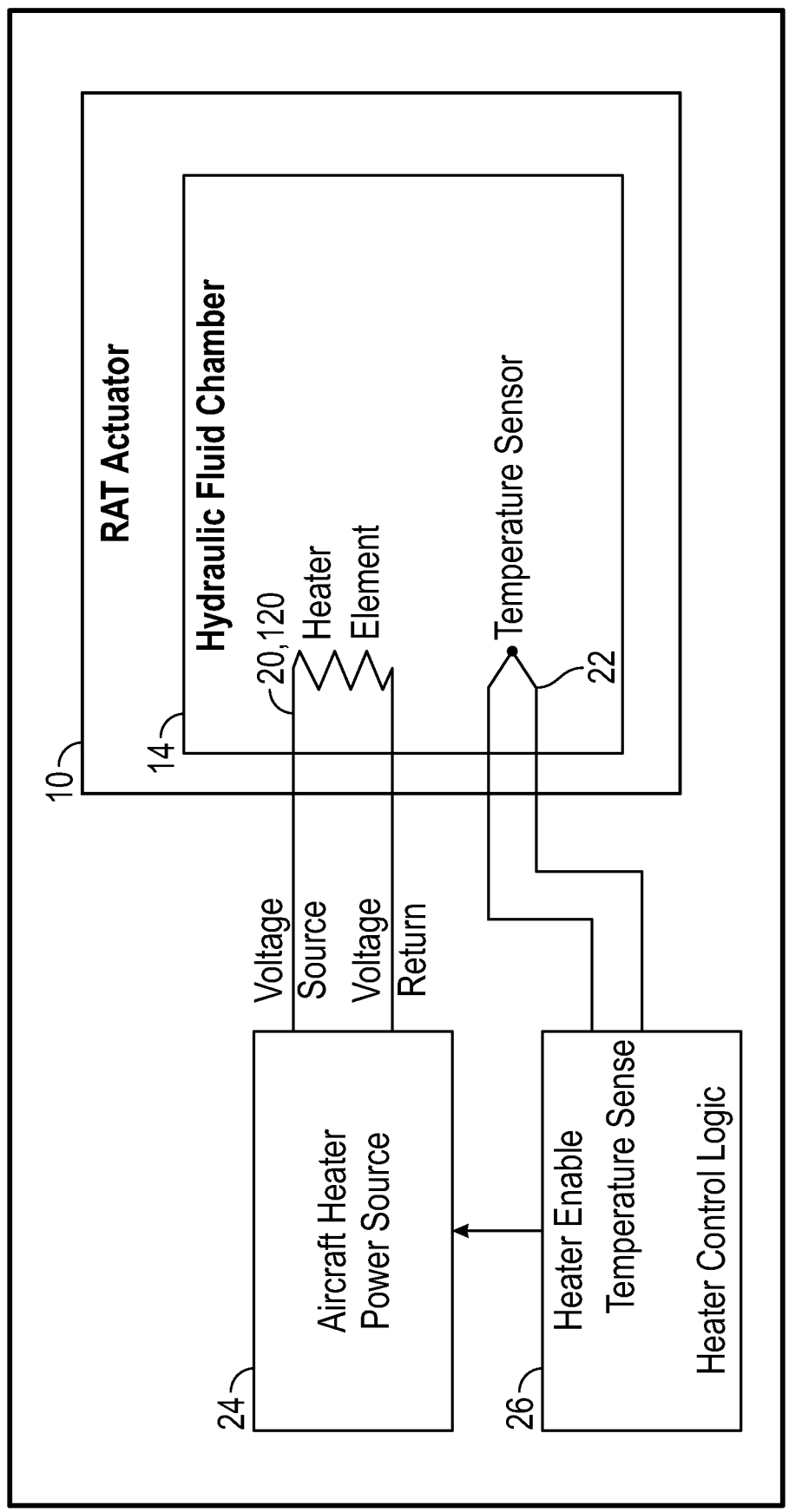

Example embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

FIG. 1 is a side view of a ram air turbine deployment actuator assembly, according to certain embodiments of the present disclosure;

FIG. 2 is a partial cross-sectional side view of the ram air turbine deployment actuator assembly of FIG. 1;

FIG. 3 is a side view of another ram air turbine deployment actuator assembly, according to certain embodiments of the present disclosure; and FIG. 4 is an actuator heating member block diagram.

DETAILED DESCRIPTION

A detailed description of one or more embodiments of the disclosed apparatus and method are presented herein by way of exemplification and not limitation with reference to the figures.

The example embodiments disclosed herein are illustrative of ram air turbine deployment actuator assemblies, and systems of the present disclosure and methods/techniques thereof. It should be understood, however, that the disclosed embodiments are merely examples of the present disclosure, which may be embodied in various forms. Therefore, details disclosed herein with reference to example ram air turbine deployment actuator assemblies and associated processes/techniques of fabrication/assembly and use are not to be interpreted as limiting, but merely as the basis for teaching one skilled in the art how to make and use the assemblies/systems and/or alternative assemblies/systems of the present disclosure.

The present disclosure provides for ram air turbine deployment actuator assemblies utilizing an actuator heating member. More particularly, the present disclosure provides for ram air turbine deployment actuator assemblies utilizing an integrated electric heating member in the actuator housing.

Current practice provides that to achieve ram air turbine ("RAT") deployment, the use of a linear deployment actuator can be used, and the actuator can utilize an integrated hydraulic loop to provide snubbing to reduce the impact load of the RAT on aircraft structure at the end of deployment. The viscosity of the hydraulic fluid internal to the hydraulic loop can influence RAT deployment time, as the hydraulic fluid temperature inversely affects the viscosity of the fluid as well as the time to deploy the RAT. It is noted that it can be desired to minimize the deployment time of the RAT in order to reduce the time an aircraft is without power during an emergency. The present disclosure provides that by warming the hydraulic fluid in a ram air turbine deployment actuator assembly (e.g., by warming the hydraulic fluid in a hydraulic snubbing loop of a ram air turbine deployment actuator assembly), the viscosity of the hydraulic fluid is reduced, thus helping to reduce RAT deployment time.

As such, there can be issues with the time to deploy a conventional RAT from its stowed to deployed position (e.g., deployment may be too slow). Some RATs are deployed through the use of a linear actuator which utilizes hydraulic fluid internal to the actuator to reduce the impact loads at the end of deployment. This hydraulic fluid when cold will tend to increase deployment times as the temperature of the fluid decreases. The present disclosure provides that by increasing the temperature of the fluid, this can improve or speed up the RAT deployment time.

FIG. 1 is a side view of a ram air turbine deployment actuator assembly 10, according to certain embodiments of the present disclosure.

In general, ram air turbine deployment actuator assembly 10 can be used to deploy a RAT, with the RAT providing emergency electrical and/or hydraulic power to aircraft or the like. System operation can require a RAT to transition from a stowed position (e.g., internal to the aircraft fuselage) to a deployed position (e.g., external to the aircraft fuselage).

The present disclosure provides that in order to achieve RAT deployment, an example ram air turbine deployment actuator assembly 10 (e.g., linear deployment actuator assembly 10) can be utilized. The RAT deployment actuator assembly 10 can utilize stored spring energy of spring 12 to extend a portion of the actuator assembly 10. Additionally and as shown in FIGS. 1-2, the RAT deployment actuator assembly 10 can utilize a hydraulic fluid cavity/chamber 14 that provides an integrated hydraulic loop (e.g., to provide snubbing to reduce the impact load of the RAT on aircraft structure at the end of deployment). The viscosity of the hydraulic fluid 16 internal to the hydraulic fluid cavity/chamber 14 for the hydraulic snubbing loop can influence the deployment time of the RAT.

As discussed above, it can be desirable to minimize deployment time of the RAT (e.g., to reduce the time an aircraft is without power during an emergency). The present disclosure provides that by warming the hydraulic fluid 16 in RAT deployment actuator assembly 10 via an actuator heating member 20 (e.g., by warming the hydraulic fluid 16 in a hydraulic fluid cavity/chamber 14 that provides an integrated hydraulic snubbing loop), the viscosity of the hydraulic fluid 16 is reduced, thus helping to reduce RAT deployment time via the actuator heating member 20 of the ram air turbine deployment actuator assembly 10.

In general and as shown in FIG. 1, example ram air turbine deployment actuator assembly 10 includes an actuator housing 18. The actuator housing 18 defines a hydraulic fluid cavity/chamber 14 that provides an integrated hydraulic loop (e.g., to provide snubbing to reduce the impact load of the RAT on aircraft structure at the end of deployment). As noted, the viscosity of the hydraulic fluid 16 (e.g., hydraulic oil 16) internal to the hydraulic fluid cavity/chamber 14 for the hydraulic snubbing loop can influence the deployment time of the RAT.

In general and as discussed further below, the present disclosure provides for an integrated heating member 20 or 120 (e.g., integrated electric heating member 20 or 120) into or on the actuator housing 18. The heating member 20, 120 can be positioned to maximize heat transfer from the heating member 20, 120 to the actuator hydraulic fluid 16 in cavity 14 (e.g., fluid 16 in the snubbing loop of cavity 14).

In an example embodiment and as shown in FIGS. 1-2, the heating member 20 can be a probe style resistive heating member 20. For example, heating member 20 can be a screw plug immersion probe style resistive heating member 20. The screw plug immersion probe style resistive heating member 20 can be inserted or positioned into the hydraulic fluid cavity 14 of the actuator housing 18 through a threaded/boss interface (e.g., similar to the mounting of a pressure transducer or the like). In general, heating member 20 is associated with a temperature sensor 22 inserted or positioned into the hydraulic fluid cavity 14 of the actuator housing 18.

In other embodiments and as shown in FIG. 3, the heating member 120 is a foil type resistive heating member 120 incorporated into or on the actuator housing 18 (e.g., proximal to hydraulic fluid cavity 14 of the actuator housing 18). Similar to member 20, heating member 120 can be associated with a temperature sensor 22 inserted or positioned into the hydraulic fluid cavity 14 of the actuator housing 18 (FIG. 2).

In example embodiments and as illustrated in FIG. 4, heating member 20 or 120 can utilize a power source 24 (e.g., electric power source 24) of the aircraft available for this utility use, such as, for example, 28 Vdc or 115 Vac as the power source 24.

The temperature of the hydraulic fluid/oil 16 can be controlled via feedback from the temperature sensor 22 (e.g., thermocouple 22). This temperature feedback can be utilized in the power control logic 26 of the heating member 20, 120 to maintain power to the heating member 20, 120 when the hydraulic fluid 16 is below a certain temperature threshold (e.g., below a pre-determined temperature set-point or threshold), and turn off power to the heating member 20, 120 when the temperature is above a certain temperature threshold (e.g., above a pre-determined temperature set-point or threshold). In example embodiments, the power control logic 26 for the heating member 20, 120 can incorporate a moderate level of hysteresis in the turn-on and turn-off temperature thresholds.

In general, simple descriptive logic for power-on operation for heating member 20, 120 can be to power the heating member 20, 120 when the power source 24 is available, and the temperature of the actuator hydraulic fluid 16 was below a pre-determined temperature determined or agreed upon for a given hydraulic fluid 16 for each particular application.

As such, the assemblies 10 of the present disclosure provide that an integrated heating member 20, 120 incorporated into the housing 18 of the RAT deployment actuator assembly 10 can increase the temperature of the hydraulic fluid 16 internal to the actuator housing 18, resulting in decreased viscosity of the hydraulic fluid 16 which then results in decreased or improved RAT deployment times.

There are many benefits of the assemblies 10, systems and methods of the present disclosure, including, without limitation: improved RAT deployment/start time; reduced time the aircraft could be without power from a RAT (e.g., decreased time in the loss of electric power or hydraulic power or both); and/or the assemblies 10 can improve issues with RAT deployment times by decreasing such deployment times.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The term "about" is intended to include the degree of error associated with measurement of the particular quantity based upon the equipment available at the time of filing the application.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

Although the assemblies, systems and methods of the present disclosure have been described with reference to example embodiments thereof, the present disclosure is not limited to such example embodiments and/or implementations. Rather, the assemblies, systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A ram air turbine deployment actuator assembly comprising:
   an actuator housing that defines a hydraulic fluid cavity, the hydraulic fluid cavity housing a hydraulic fluid; and
   a heating member positioned proximal to the hydraulic fluid cavity of the actuator housing;
   wherein the heating member is configured to increase a temperature of the hydraulic fluid to decrease a viscosity of the hydraulic fluid before or during deployment of a ram air turbine via the ram air turbine deployment actuator assembly; and
   wherein the heating member is associated with a temperature sensor inserted or positioned into the hydraulic fluid cavity of the actuator housing.

2. The ram air turbine deployment assembly of claim 1, wherein the heating member is a probe style resistive heating member, at least a portion of the probe style resistive heating member positioned in the hydraulic fluid cavity of the actuator housing via a threaded boss interface.

3. The ram air turbine deployment assembly of claim 1, wherein the heating member is a foil type resistive heating member incorporated into or on the actuator housing proximal to hydraulic fluid cavity.

4. The ram air turbine deployment assembly of claim 1, wherein the temperature of the hydraulic fluid is controlled via temperature feedback from the temperature sensor.

5. The ram air turbine deployment assembly of claim 4, wherein the temperature feedback is utilized in a power control logic associated with the heating member to maintain power to the heating member when the hydraulic fluid is below a pre-determined temperature set-point and to turn off power to the heating member when the hydraulic fluid is above a pre-determined temperature set-point.

6. The ram air turbine deployment assembly of claim 1, wherein the heating member is configured to utilize a power source of an aircraft.

7. The ram air turbine deployment assembly of claim 1, wherein the hydraulic fluid cavity provides an integrated hydraulic loop to provide snubbing to reduce an impact load of the ram air turbine on aircraft structure during or after deployment.

8. The ram air turbine deployment assembly of claim 1, wherein the ram air turbine deployment actuator assembly is configured to utilize stored spring energy of a spring to extend a portion of the ram air turbine deployment actuator assembly.

9. The ram air turbine deployment assembly of claim 1, wherein the ram air turbine deployment actuator assembly comprises a linear deployment actuator and an integrated hydraulic loop.

10. A method for operating a ram air turbine deployment actuator comprising:
    providing an actuator housing that defines a hydraulic fluid cavity, the hydraulic fluid cavity housing a hydraulic fluid; and
    positioning a heating member proximal to the hydraulic fluid cavity of the actuator housing; and
    increasing a temperature of the hydraulic fluid, via the heating member, to decrease a viscosity of the hydraulic fluid before or during deployment of a ram air turbine via the ram air turbine deployment actuator; and
    wherein the heating member is associated with a temperature sensor inserted or positioned into the hydraulic fluid cavity of the actuator housing.

11. The method of claim 10, wherein the heating member is a probe style resistive heating member, at least a portion of the probe style resistive heating member positioned in the hydraulic fluid cavity of the actuator housing via a threaded boss interface.

12. The method of claim 10, wherein the heating member is a foil type resistive heating member incorporated into or on the actuator housing proximal to hydraulic fluid cavity.

13. The method of claim 10, wherein the temperature of the hydraulic fluid is controlled via temperature feedback from the temperature sensor.

14. The method of claim 13, wherein the temperature feedback is utilized in a power control logic associated with the heating member to maintain power to the heating member when the hydraulic fluid is below a pre-determined temperature set-point and to turn off power to the heating member when the hydraulic fluid is above a pre-determined temperature set-point.

15. The method of claim 10, wherein the heating member is configured to utilize a power source of an aircraft.

16. The method of claim 10, wherein the hydraulic fluid cavity provides an integrated hydraulic loop to provide snubbing to reduce an impact load of the ram air turbine on aircraft structure during or after deployment.

17. The method of claim 10, wherein the ram air turbine deployment actuator is configured to utilize stored spring energy of a spring to extend a portion of the ram air turbine deployment actuator.

18. The method of claim 10, wherein the ram air turbine deployment actuator comprises a linear deployment actuator and an integrated hydraulic loop.

\* \* \* \* \*